United States Patent [19]

Kataoka

[11] Patent Number: 5,316,596
[45] Date of Patent: May 31, 1994

[54] ROLL SHELL MATERIAL AND CENTRIFUGAL CAST COMPOSITE ROLL

[75] Inventor: Yoshihiro Kataoka, Chiba, Japan

[73] Assignee: Kawasaki Steel Corporation, Kobe, Japan

[21] Appl. No.: 50,394

[22] PCT Filed: Mar. 31, 1992

[86] PCT No.: PCT/JP92/00400

§ 371 Date: May 7, 1993

§ 102(e) Date: May 7, 1993

[87] PCT Pub. No.: WO93/05192

PCT Pub. Date: Mar. 18, 1993

[30] Foreign Application Priority Data

Sep. 12, 1991 [JP] Japan .................. 3-260486
Sep. 26, 1991 [JP] Japan .................. 3-273597
Oct. 24, 1991 [JP] Japan .................. 3-303832

[51] Int. Cl.$^5$ .............................. C22C 38/36
[52] U.S. Cl. .............................. 148/321; 148/324; 420/15; 420/12; 428/683
[58] Field of Search ............ 148/321, 324; 420/15, 420/12, 9; 428/683, 685

[56] References Cited

U.S. PATENT DOCUMENTS 5,225,007 7/1993 Hattori et al. ............... 148/324

FOREIGN PATENT DOCUMENTS 45-40777 12/1970 Japan .
58-86974 5/1983 Japan .
59-143048 8/1984 Japan .
61-37949 2/1986 Japan .................. 148/324
61-21299 5/1986 Japan .
62-136556 6/1987 Japan .
63-266043 11/1988 Japan .

*Primary Examiner*—Deborah Yee
*Attorney, Agent, or Firm*—Dvorak and Traub

[57] ABSTRACT

A roll shell, material is composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and satisfies the following formulae (1) and (2):

$$V + 1.8\,Nb \leq 7.5\,C - 6.0\ (\%) \quad (1)$$

$$0.2 \leq Nb/V \leq 0.8 \quad (2)$$

and remainder of Fe and inherent impurities.

12 Claims, 9 Drawing Sheets

ROLL SHELL MATERIAL AND CENTRIFUGAL CAST COMPOSITE ROLL

FIELD OF THE INVENTION

The present invention relates to a roll shell material and a centrifugal cast composite roll which has excellent wear resistance and crack resistance.

BACKGROUND ART

Recently, the most widely used rolls for hot rolling mills, have been composite type rolls composed of an outer shell and a core material. The conventional method of producing these rolls is centrifugally casting technique, where the shell metal is first poured into the rotating mold then the core metal is added to the mold after shell solidification. Usually, wear resistant cast iron such as nickel-chromium alloyed grain iron (Ni-G) or high chromium iron (Hi-Cr) precipitating cementaite type carbide is used for the shell material, and gray iron or ductile iron is used for the core material.

For a demand for more severe rolling condition and for improvement of productivity in rolling, a roll having higher wear resistance and crack resistance has been required.

In view of such circumstance. Japanese Unexamined Patent Publication (Kokai) No. 60-124407 and Japanese Unexamined Patent Publication(Kokai) No. 61-177355 propose application of high Vanadium (V) iron for the shell material of the centrifugal cast roll.

PROBLEM TO BE SOLVED BY THE INVENTION

However, when the high Vanadium (V) iron is applied to the shell of the roll in the centrifugal casting method, V carbide having small specific gravity can segregate by centrifugal force to make the internal characteristics of the roll shell layer not uniform in the thickness direction. This tendency is more significant in greater rolls having greater thickness of the shell to cause a problem that such roll is not applicable for a practical roll.

Japanese Unexamined Patent Publication No. 58-87249 and Japanese Unexamined Patent Publication No. 1-96355 propose roll materials, in which highly alloyed steel or iron equivalent to a high speed steel is applied. However, Japanese Unexamined Patent Publication No. 58-87249 is directed to a shrink fitting or assembling roll to encounter a problem of slip between the sleeve and the arbor during rolling. On the other hand, Japanese Unexamined Patent Publication No. 1-96355 is only applicable for special manufacturing process, such as continuous casting for cladding method or so forth other than centrifugally casting process to encounter problems in its productivity and cost advantage.

In effect, upon production of the roll, although improvement of wear resistance can be achieved by applying a high carbon high V steel for the shell material, it may encounter a problem of not uniform properties in the shell due to occurrence of segregation of carbide by centrifugal force when the centrifugal casting method, which is commonly used for its high productivity and cost advantage, is employed.

It is an object of the present invention to provide a roll shell material and a centrifugal cast composite roll which has excellent wear resistance and crack resistance without any segregation even when productive and cost advantageous centrifugal casting method is employed by optimizing chemical compositions of the shell material and controlling composition of proeutectic carbide.

DISCLOSURE OF THE INVENTION

A roll shell material as defined in claim 1 is composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and satisfies the following formulae (1) and (2):

$$V + 1.8\ Nb \leq 7.5\ C - 6.0\ (\%) \quad (1)$$

$$0.2 \leq Nb/V \leq 0.8 \quad (2)$$

and remainder of Fe and inherent impurities.

A roll shell material as defined in claim 2 is composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and further composed of one or both of Ni: 5.5% or less and Co: 10.0% or less, and satisfies the following formulae (1) and (2):

$$V + 1.8\ Nb \leq 7.5\ C - 6.0\ (\%) \quad (1)$$

$$0.2 \leq Nb/V \leq 0.8 \quad (2)$$

and remainder of Fe and inherent impurities.

A roll shell material as defined in claim 3 is composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and further composed of one or two or more of Cu: 2.0% or less, W: 1.0% or less, Ti: 2.0% or less, Zr: 2.0% or less and B: 0.1% or less, and satisfies the following formulae (1) and (2):

$$V + 1.8\ Nb \leq 7.5\ C - 6.0\ (\%) \quad (1)$$

$$0.2 \leq Nb/V \leq 0.8 \quad (2)$$

and remainder of Fe and inherent impurities.

A roll shell material as defined in claim 4 is composed of C: 1.5 3.5%, Si: 1.5% or less, Mn: 1.2% or less, Cr: 5.5~12.0%, Mo: 2.0~8.0%, V: 3.0~10.0%, Nb: 0.6~7.0%, and further composed of one or both of Ni: 5.5% or less and Co: 10.0% or less, one or two or more of Cu: 2.0% or less, W: 1.0% or less, Ti: 2.0% or less, Zr: 2.0% or less and B: 0.1% or less, and satisfies the following formulae (1) and (2):

$$V + 1.8\ Nb \leq 7.5\ C - 6.0\ (\%) \quad (1)$$

$$0.2 \leq Nb/V \leq 0.8 \quad (2)$$

and remainder of Fe and inherent impurities.

A centrifugal cast roll as defined in claim 5 is formed with the outer shell as defined in one of claims 1~4 and a core and neck material of gray cast iron or ductile cast iron integrated with the outer shell by metallurgical bonding.

A centrifugal cast roll as defined in claim 6 includes an intermediate layer between the outer shell and the core material defined in claim 5, in which the outer shell and the core material are integrated by metallurgical bonding via the intermediate layer.

EFFECT OF THE INVENTION

Discussion will be given for the reason of limitation of content of the alloying elements in the present invention and limiting formulae for the amounts of V, Nb and C.

C: 1.5~3.5%

C is an essential element for increasing hardness, and wear resistance of the roll material through forming a hard carbide and required 1.5% or more. However, when C content exceeds 3.5%, crack resistance is significantly lowered. Therefore, 3.5% is set as the upper limit.

Si: 1.5% or less

Si serves as deoxidation agent and is necessary element to certainly maintain casting ability. However, when Si content exceeds 1.5%, the crack resistance is lowered. Therefore, 1.5% is set as the upper limit.

Mn: 1.2% or less

Mn is necessary for the same purpose to Si. However, it is not desirable to contain Mn in the content exceeding 1.2% for lowering of the crack resistance. Therefore, 1.2% is set as the upper limit.

Cr: 5.5~12.0%

Cr is an essential element for forming the carbide and increasing wear resistance. Therefore, Cr is added for 5.5% or more. However, when Cr content exceeds 12.0% and V, Nb which are the intended elements, are added, the wear resistance is lowered. Therefore, 12.0% is set as the upper limit.

Mo: 2.0%~8.0%

Mo is effective for forming the carbide and increasing wear resistance similarly to Cr, and, in addition, effective for strengthening the matrix by increasing hardenability and resistance of temper softening. Therefore, Mo is added in the content of 2.0% or more. However, when Mo content exceeds 8.0%, the crack resistance is lowered. Therefore, 8.0% is set as the upper limit.

Ni: 5.5% or less and Co: 10.0% or less

Ni serves for increasing the hardenability and strength of the matrix. However, when it is undesirable to contain Ni in a content exceeding 5.5% for formation of unstable structure, such as retained austenite. Therefore, 5.5% is set as the upper limit.

Co is added to stabilize the micro structure of the matrix at high temperature and improve the hardness and strength. However, since these effects saturate when the content exceeds 10.0%. Therefore, in economical view point, the upper limit is set at 10.0%.

Cu: 2.0% or less and W: 1.0% or less

Cu and W are both added for strengthening the matrix structure and increasing hardness at high temperature. However, Cu in excess of 2.0% deteriorates the surface characteristics of the roll and both of wear resistance and crack resistance. Therefore, the upper limit of Cu is set at 2.0%. W is an element having high specific gravity to promote segregation of proeutectoid carbide during centrifugal casting if excessively added. Therefore, the upper limit of W is set at 1.0%.

Ti: 2.0% or less, Zr: 2.0% or less, B: 0.1% or less

Ti, Zr and B are added to suppress formation of large eutectic carbide and to improve wear resistance and crack resistance. However, when the contents of Ti and Zr exceed 2.0%, it may deteriorate configuration of composite carbide of V and Nb and conversely lower the wear resistance. Therefore, the upper limits of Ti and Zr are respectively set at 2.0%. When B exceeds 0.1%, it may segregate at the boundary of particles to lower crack resistance. Therefore, the upper limit of B is set at 0.1%.

V: 3.0~10.0%, Nb 0.6~7.0%

V and Nb are most important elements in the present invention. The combined addition and content limiting conditions therefore are most important feature of the invention.

V is an essential element for forming MC or $M_4C_3$ carbide which are the most effective carbide for increasing the wear resistance. In order to attain the effect, it is required to be added in the content of 3.0% or more. However, even it exceeds 10.0%, the crack resistance can be lowered for causing problem in production. Therefore, the upper limit is set at 10.0%.

Nb also forms MC carbide similarly to V, which is effective for increasing the wear resistance. However, when Nb is solely added, it forms large size carbide block to make effect impossibly to attain and to cause a problem in crack resistance.

In view of this, FIGS. 1~4 illustrate the influence of the relation between C content and V and Nb contents on hardness of the base material, and FIGS. 5~8 show the influence of Nb to V content ratio on the wear ratio between the outer layer and the inner layer due to carbide distribution of the centrifugal cast sleeve, and on the maximum depth of the crack in thermal shock test, when V and Nb are added in combination.

From FIGS. 1~4, in order to obtain necessary hardness Hs 75 or more for wear resistive hot mill roll, it is found that $$V + 1.8\, Nb \leq 7.5\, C - 6.0\ (\%)$$

has to be satisfied.

It should be noted that the experiment in FIG. 1 was performed using a sample, in which 25 mm Y/blocks were cast from molten iron containing Si: 0.5%, Mn: 0.5%, Cr: 6.8%, Mo: 3.2% with varying composition of C, V and Nb, and cast blocks were normalized at 1000° C. and tempered at 550° C. The experiment in FIG. 2 was performed using a sample, in which 25 mm Y/blocks were cast from molten iron containing Si: 0.5%, Mn: 0.5%, Ni: 2.7%, Cr: 7.2%, Mo: 3.5% with varying composition of C, V and Nb, and cast blocks were normalized at 1000° C. and tempered at 550° C. The experiment in FIG. 3 was performed using a sample, in which 25 mm Y/blocks were cast from molten iron containing Si: 0.4%, Mn: 0.4%, Ni: 1.5%, Cr: 5.7%, Mo: 2.8% Co: 3.2% with varying composition of C, V and Nb, and cast blocks were normalized at 1050° C. and tempered at 550° C. The experiment in FIG. 4 was performed using a sample, in which 25 mm Y/blocks were cast from molten iron containing Si: 0.3%, Mn: 0.4%, Cr: 6.0%, Mo: 3.2%, Co: 4.1% with varying composition of C, V and Nb, and cast blocks were normalized at 1050° C. and tempered at 550° C.

On the other hand, from FIGS. 5~8, in order to obtain uniform roll shell even by produced through the centrifugal casting process and without causing deterioration of the crack resistance, it is found that $$0.2 \leq Nb/V \leq 0.8$$

has to be satisfied.

It should be noted that "wear ratio (inner layer/outer layer)" of FIGS. 5~8, represents a ratio (Iw/Ow) of a wear loss (Iw) of a sample taken from the inner layer side of sleeve to a wear loss (Ow) of a sample taken from the outer layer side, and "thermal shock crack maximum depth" represents a maximum depth of the crack generated in thermal shock test.

The experiment in FIG. 5 was performed using samples, in which sleeve samples of 100 mm thick were cast from a molten iron containing C: 2.5%, Si: 0.5%, Mn: 0.5%, Cr: 6.5%, Mo: 3.5%, V: 5.4%, Nb: 0~8.0% by centrifugal casting (140 G) and the cast sleeve samples were normalized at 1000° C. and tempered at 550° C. The experiment in FIG. 6 was performed using samples, in which sleeve samples of 100 mm thick were cast from a molten iron containing C: 2.7%, Si: 0.6%, Mn: 0.5%, Ni: 3.2%, Cr: 7.4%, Mo: 3.7%, V: 5.8%, Nb: 0~7.5% by centrifugal casting (140 G) and the cast sleeve samples were normalized at 1000° C. and tempered at 550° C. The experiment in FIG. 7 was performed using samples, in which sleeve samples of 100 mm thick were cast from a molten iron containing C: 2.3%, Si: 0.4%, Mn: 0.5%, Ni: 0.5%, Cr: 5.5%, Mo: 3.2%, V: 5.4%, Co: 5.2%, Nb: 0~7.2% by centrifugal casting (140 G) and the cast sleeve samples were normalized at 1050° C. and tempered at 550° C. The experiment in FIG. 8 was performed using samples, in which sleeve samples of 100 mm thick were cast from a molten iron containing C: 2.2%, Si: 0.3%, Mn: 0.4%, Cr: 6.0%, Mo: 3.2%, V: 5.1%, Co: 4.1%, Nb: 0~6.0% by centrifugal casting (140 G) and the cast sleeve samples were normalized at 1050° C. and tempered at 550° C.

A wear test was performed by slip wear type test which apparatus consists of two discs ($\phi$190 mm×15 mm counterpart piece and $\phi$50 mm×10 mm testing piece), in which the counterpart piece was heated at 800° C. and contacted with the testing piece at a pressure of 100 kgf. The testing piece was rotated at a speed of 800 r.p.m. at a slip rate 3.9%. After 120 minutes, a wear loss was measured.

On the other hand, the thermal shock test was performed in the type where a 55 mm×40 mm×15 mm of plate form testing piece was pressed onto a roller rotating at 1200 r.p.m. under a load of 150 kgf for 15 seconds of contacting period and subsequently watercooled. The length of crack generated in the testing piece was measured.

Furthermore, as a heat treatment condition to be provided for the roll material according to the invention, a controlled cooling is performed for making the structure after cooling into bainite, after an austenitizing at a temperature of 1000°~1150° C. Accordingly, depending upon the composition, configuration and size of the roll material to be treated, the cooling condition should be optimized. In the experiments in FIGS. 1~4 and FIGS. 5~8, since the size of the material to be heat treated is small, both treatment of the normalizing (air cooling after austenitizing) and quenching (intended cooling after austenitizing) can be performed. It should be noted that the tempering should be performed by selecting an optimum condition in the temperature range of 500°~600° C.

EMBODIMENT

Embodiment 1

Figure 1:
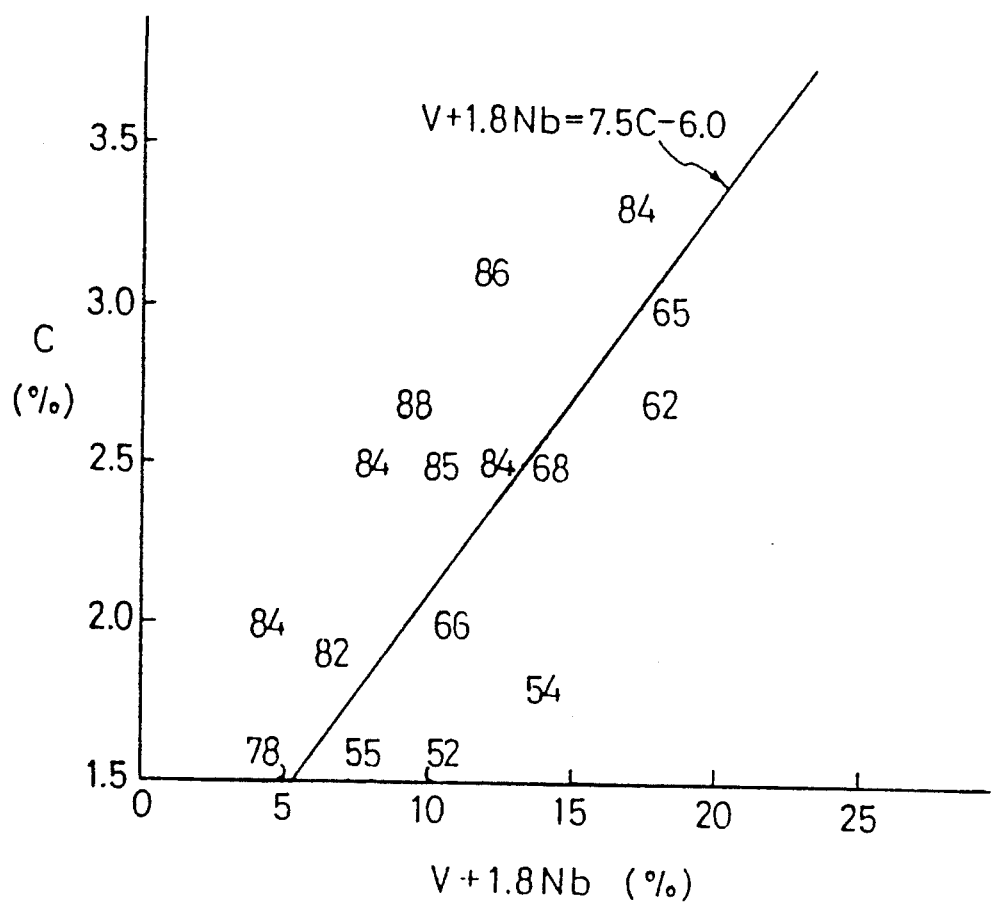
FIG. 1 is a graph illustrating the relationship between combined adding content of V, Nb and the content of C affecting hardness of the base material.
Figure 2:
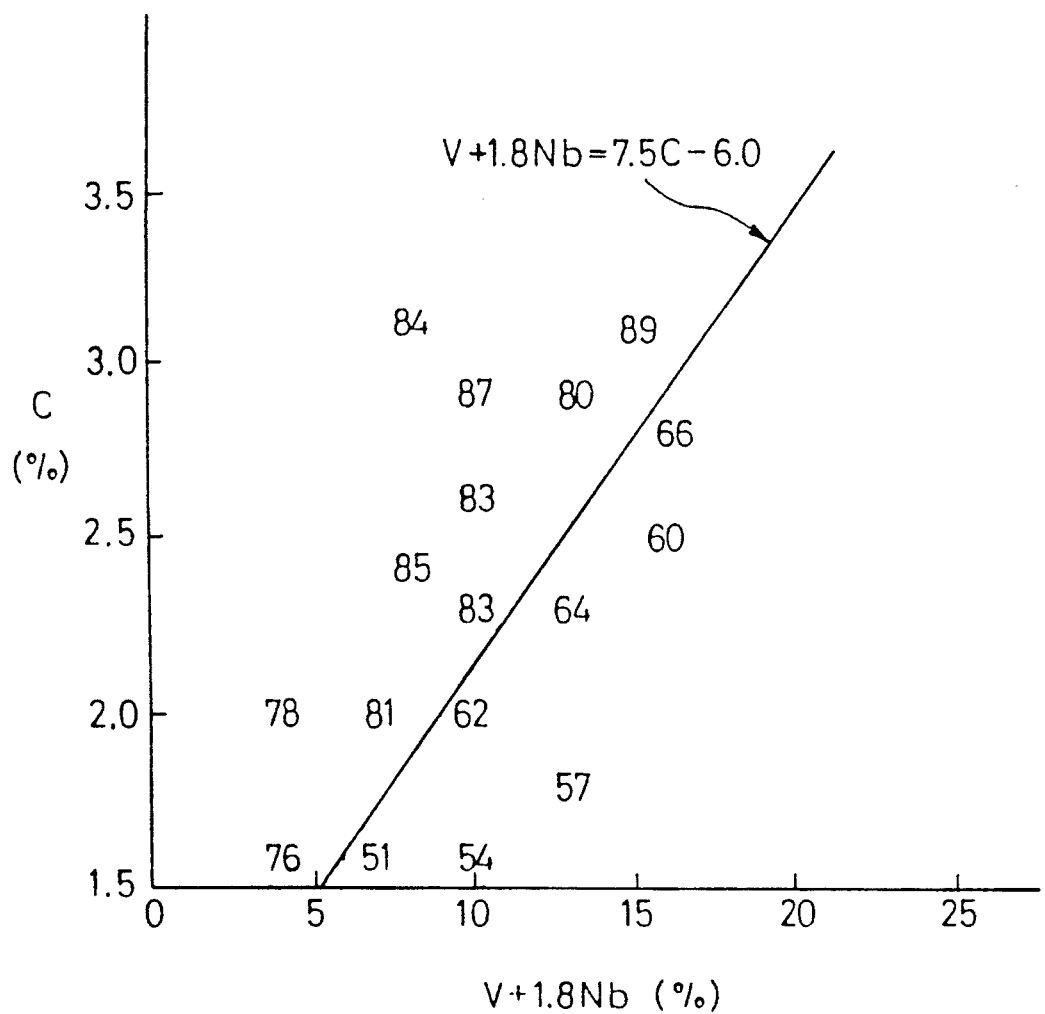
FIG. 2 is a graph illustrating the relationship between combined adding content of V, Nb and the content of C affecting hardness of the base material.
Figure 3:
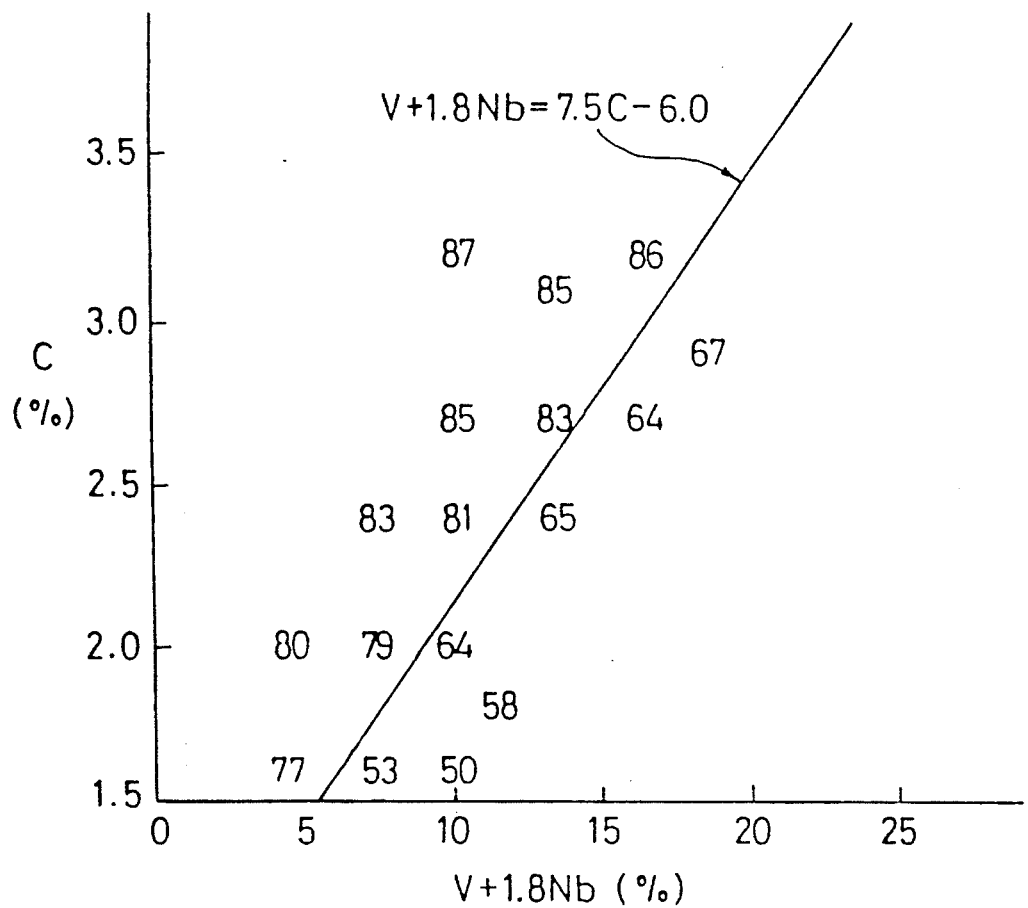
FIG. 3 is a graph illustrating the relationship between combined adding content of V, Nb and the content of C affecting hardness of the base material.
Figure 4:
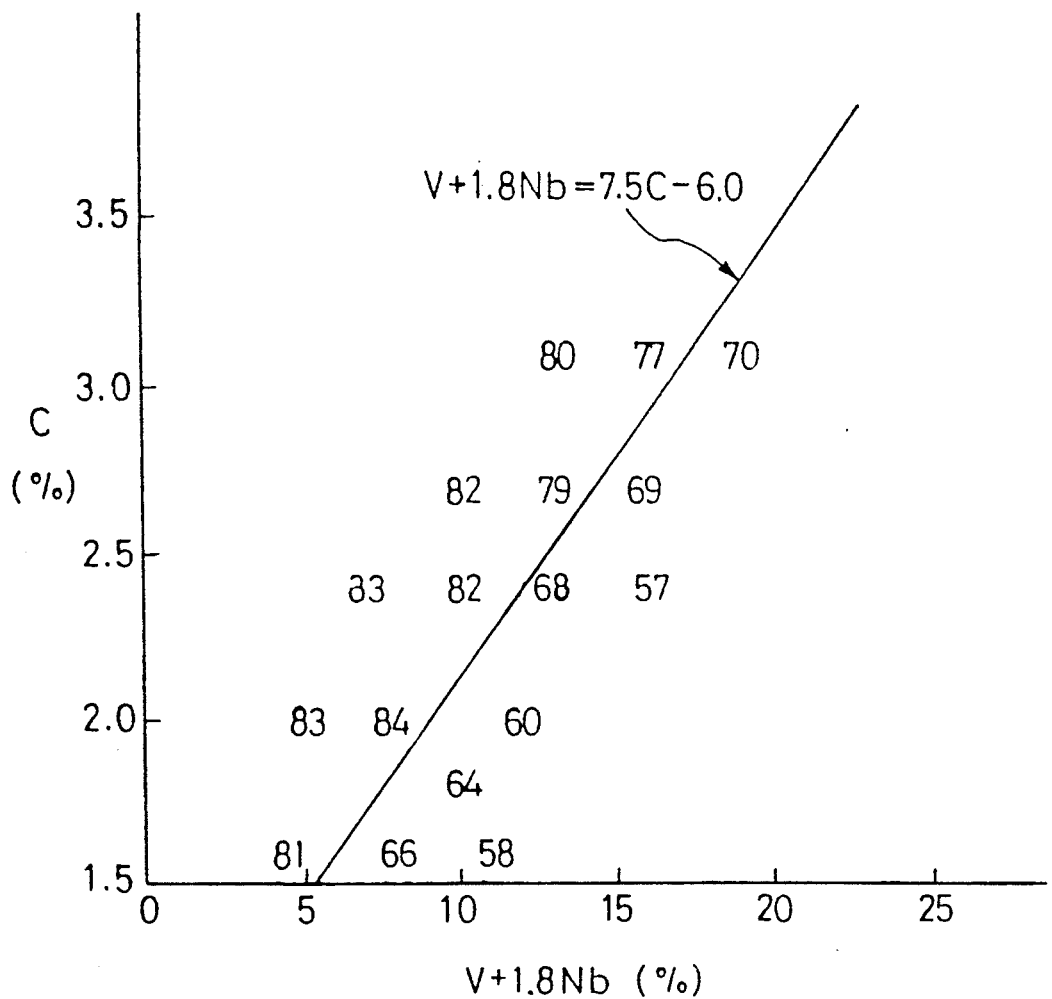
FIG. 4 is, a graph illustrating the relationship between combined adding content of V, Nb and the content of C affecting hardness of the base material.
Figure 5:
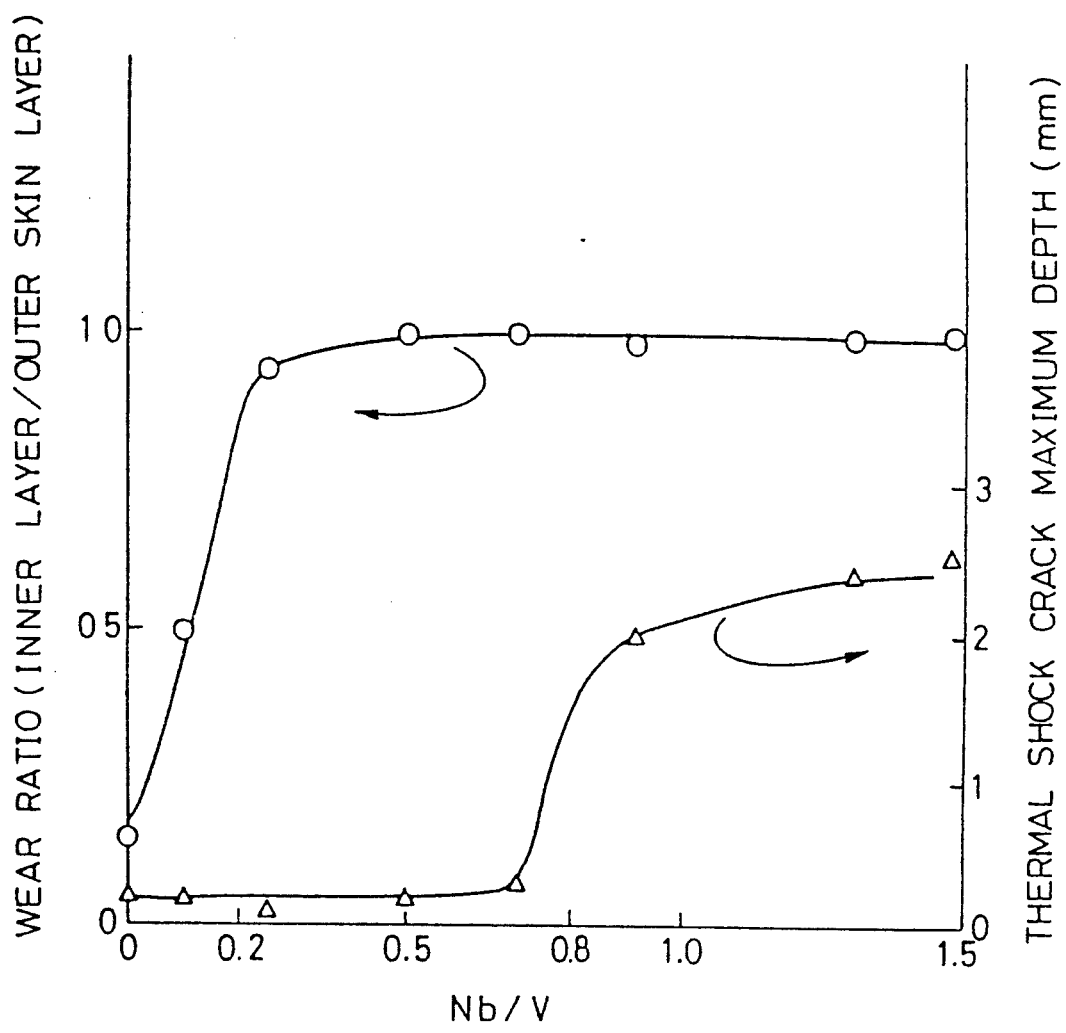
FIG. 5 is a graph showing the influence of Nb to V content ratio on the wear ratio between the outer layer and the inner layer due to carbide distribution of the centrifugal cast sleeve, and on the maximum depth of the crack in thermal shock test.
Figure 6:
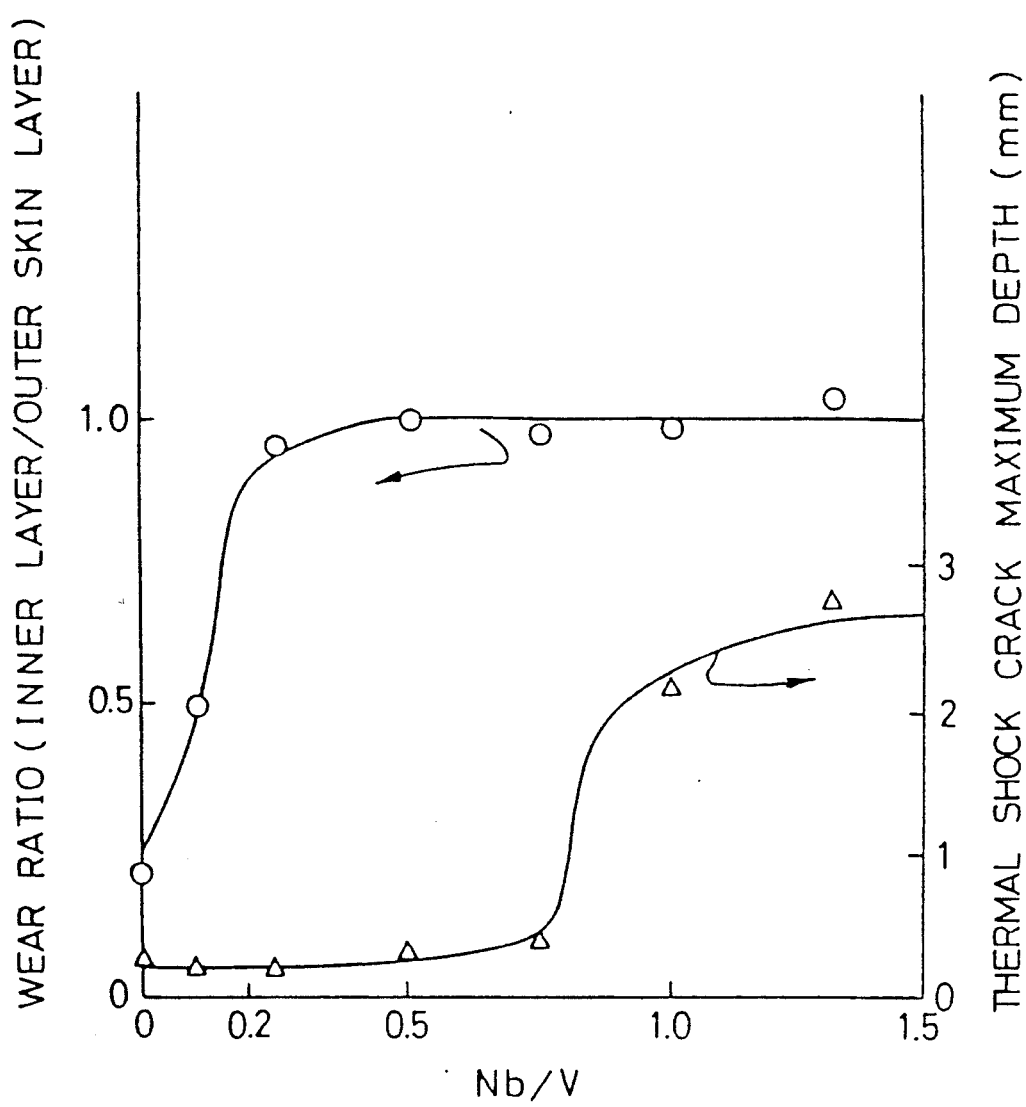
FIG. 6 is a graph showing the influence of Nb to V content ratio on the wear ratio between the outer layer and the inner layer due to carbide distribution of the centrifugal cast sleeve, and on the maximum depth of the crack in thermal shock test.
Figure 7:
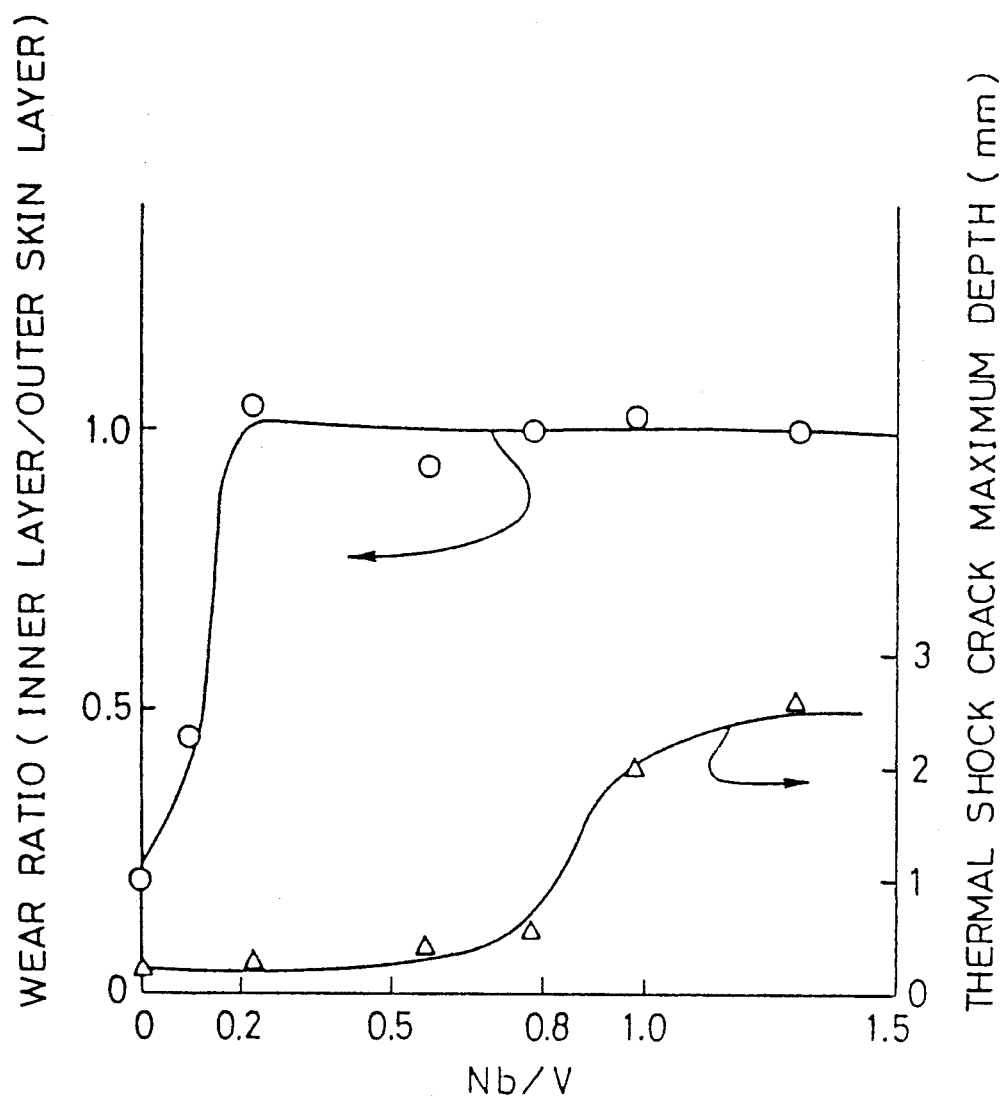
FIG. 7 is a graph showing the influence of Nb to V content ratio on the wear ratio between the outer layer and the inner layer due to carbide distribution of the centrifugal cast sleeve, and on the maximum depth of the crack in thermal shock test.
Figure 8:
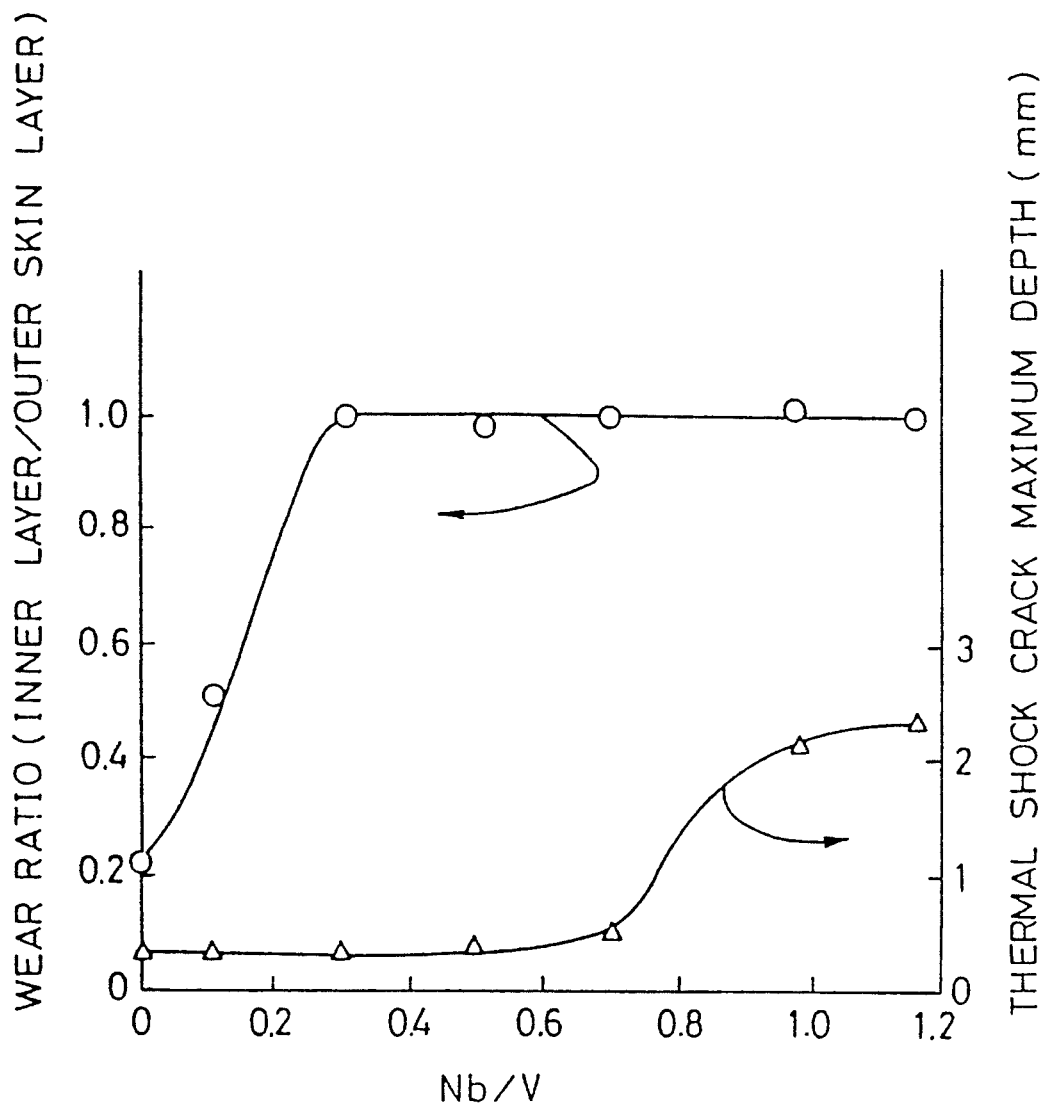
FIG. 8 is a graph showing the influence of Nb to V content ratio on the wear ratio between the outer layer and the inner layer due to carbide distribution of the centrifugal cast sleeve, and on the maximum depth of the crack in thermal shock test.

Molten irons (materials of invention: B~F, R, S and materials of comparative example: A, G~Q) having chemical composition shown in table 1 were cast by the centrifugal casting (140 G) to experimentarily form sleeve samples of 100 mm thick. For the sleeve samples after heat treatments, a shore hardness test, hot wear test and thermal shock test were performed.

It should be noted that the wear test was performed in the above-mentioned condition and the same method by sampling the above-mentioned test pieces of $\phi$50 ×10 from the inner layer and the outer layer of the sleeve samples.

On the other hand, the thermal shock test was performed under the same condition with sample of the plate cut from the outer layer of the sleeve samples.

The results of the wear test and the thermal shock test are shown in table 2. According to the table 2, the material of the present invention has equivalent hardness as compared with Ni-grain iron (A material) but is found substantial increasing in wear resistance and crack resistance.

Also, since the materials of the comparative examples G~Q are out of the limitation of the present invention, G material causes lowering of the wear resistance of the outer layer due to segregation of the carbide, H material causes lack of hardness and lowering of the crack resistance, I material causes lack of hardness and lowering of the wear resistance of the outer layer due to segregation of the carbide, J material causes lack of hardness. Also, for excess content of C, K material causes lowering of the crack resistance. For excess content of Si, L material causes lowering of the crack resistance. For excess content of Mn, M material causes lowering of the crack resistance. For excess content of Cr, N material causes lowering of the wear resistance and the crack resistance. For excess content of Mo, O material causes lowering of the crack resistance. For insufficient content of V, P material causes lowering of the wear resistance and the crack resistance. For excess content of V, Q material causes lowering of the crack resistance.

Embodiment 2

Molten irons (materials of invention: B~F, S, T, U, V and materials of comparative example: A, G~R) having chemical composition shown in table 3 were cast by the centrifugal casting (140 G) to experimentarily form sleeve samples of 100 mm thick. For the sleeve samples after hear treatments, a shore hardness test, hot wear test and thermal shock test were performed.

It should be noted that the wear test was performed in the above-mentioned condition and the same method by sampling the above-mentioned test pieces of $\phi 50 \times 10$ from the inner layer and the outer layer of the sleeve samples.

On the other hand, the thermal shock test was performed under the same condition with sample of the plate cut from the outer layer of the sleeve samples.

The results of the wear test and the thermal shock test are shown in table 4. According to the table 4, the material of the present invention has equivalent hardness as compared with Ni-grain iron (A material) but is found substantial increasing in wear resistance and crack resistance. Also, since the materials of the comparative examples G~J are out of the limitation of the present invention, G, J materials cause lack of hardness, H material causes lowering of the wear resistance of the outer layer due to segregation of the carbide, I material causes lowering of the crack resistance. In the comparative examples K~R, for excess content of C, K material causes lowering of the crack resistance. For excess content of Si, L material causes lowering of the crack resistance. For excess content of Mn, M material causes lowering of the crack resistance. For excess content of Ni, N material causes lowering of the hardness, the wear resistance and the crack resistance. For excess content of Cr, O material causes lowering of the wear resistance and the crack resistance. For excess content of Mo, P material causes lowering of the crack resistance. For insufficient content of V, Q material causes lowering of the wear resistance and the crack resistance. For excess content of V, R material causes lowering of the crack resistance.

Embodiment 3

Molten irons (materials of invention: B~F and materials of comparative example: A, G~R) having chemical composition shown in table 5 were cast by the centrifugal casting to experimentarily form sleeve samples of 100 mm thick. For the sleeve samples after heat treatments, a shore hardness test, hot wear test and thermal shock test were performed.

It should be noted that the wear test was performed in the above-mentioned condition and the same method by sampling the above-mentioned test pieces of $\phi 50 \times 10$ from the inner layer and the outer layer of the sleeve samples.

On the other hand, the thermal shock test was performed under the same condition with sample of the plate cut from the outer layer of the sleeve samples.

The results of the wear test and the thermal shock test are shown in table 6. According to the table 6, the material of the present invention has equivalent hardness as compared with Ni-grain iron (A material) but is found substantial increasing in wear resistance and crack resistance.

Also, the materials of the comparative examples G~R are out of the limitation of the present invention. For insufficient content of C, G material causes lack of hardness and lowering of the wear resistance of the outer layer due to segregation of the carbide, H material causes lowering of the wear resistance of the outer layer due to segregation of the carbide, I material causes lowering of the crack resistance, and J material causes lack of hardness. Also, for excess content of C, K material causes lowering of the crack resistance. For excess content of Si, L material causes lowering of the crack resistance. For excess content of Mn, M material causes lowering of the crack resistance. For excess content of Ni, N material causes lowering of the wear resistance and the crack resistance. For excess content of Cr, O material causes lowering of the wear resistance and the crack resistance. For excess content of Mo, P material causes lowering of the crack resistance. For insufficient content of V, Q material causes lowering of the wear resistance and the crack resistance. For excess content of V, R material causes lowering of crack resistance.

Embodiment 4

Molten irons(materials of invention: B~E, Q and materials of comparative example: A, F~P) having chemical composition shown in table 7 were cast by the centrifugal casting to experimentarily form sleeve samples of 100 mm thick. For the sleeve samples after heat treatments, a shore hardness test, hot wear test and thermal shock test were performed.

It should be noted that the wear test was performed in the above-mentioned condition and the same method by sampling the above-mentioned test pieces of $\phi 50 \times 10$ from the inner layer and the outer layer of the sleeve samples.

On the other hand, the thermal shock test was performed under the same condition with sample of the plate cut from the outer layer of the sleeve samples.

The results of the wear test and the thermal shock test are shown in table 8. According to the table 8, the material of the present invention has equivalent hardness as compared with Ni-grain iron (A material) but is found substantial increasing in wear resistance and crack resistance.

Also, the materials of the comparative examples F~P are out of the limitation of the present invention. For insufficient content of C, F material causes lack of hardness and lowering of the wear resistance of the outer layer due to segregation of the carbide, G material causes lowering of the wear resistance of the outer layer due to segregation of the carbide, H material causes lowering of the crack resistance, I material causes lack of hardness. Also, for excess content of C, J material causes lowering of the crack resistance. For excess content of Si, K material causes lowering of the crank resistance. For excess content of Mn, L material causes lowering of the crack resistance. For excess content of Cr, M material causes lowering of the wear resistance and the crack resistance. For excess content of Mo, N material causes lowering of the crack resistance. For insufficient content of V, O material causes lowering of the wear resistance and the crack resistance. For excess content of V, P material causes lowering of the crack resistance.

Embodiment 5

Molten irons (materials of invention: B5~J5 and materials of comparative example: A, K5~N5) having chemical composition shown in table 9 were cast by the centrifugal casting to experimentarily form sleeve samples of 100 mm thick. For the sleeve samples after heat treatments, a shore hardness test, hot wear test and thermal shock test were performed.

It should be noted that the wear test was performed in the above-mentioned condition and the same method by sampling the above-mentioned test pieces of φ50 ×10 from the inner layer and the outer layer of the sleeve samples.

On the other hand, the thermal shock test was performed under the same condition with sample of the plate cut from the outer layer of the sleeve samples.

The results of the wear test and the thermal shock test are shown in table 10. According to the table 10, the material of the present invention has equivalent hardness as compared with Ni-grain iron (A material) but is found substantial increasing in wear resistance and crack resistance.

Also, the materials of the comparative examples K5~N5 are out of the limitation of the present invention. For excess content of Cu, K5 material causes lowering of the wear resistance and the crack resistance. For excess content of W, L5 material causes lowering of the wear resistance of the outer layer due to segregation of the carbide. For excess content of Ti and B, M5 material causes lowering of the wear resistance and the crack resistance. For excess content of Zr, N5 material causes lowering of the wear resistance.

Embodiment 6

A composite roll having the outer shell and the core and neck having compositions shown in table 11 and having a roll diameter of 670 mm and a barrel length of 1450 mm was produced through the following processes. With melting the shell metal into the molten iron in a low frequency furnace, the molten shell metal was poured to have a thickness of 75 mm at 1490° C. in a centrifugal casting mold rotating at 140 G of centrifugal force. 20 minutes after casting of the shell metal, rotation of the mold was terminated and placed in the vertical position. 35 minutes after casting of the shell, the molten material of the inner layer was poured at a temperature 1420° C. After cooling to the room temperature, the mold was disassembled. After rough machining, a heat treatment was performed, in which a quenching was performed from a temperature of 1050° C. and subsequently a tempering was performed at a temperature of 550° C. After the heat treatment, inspections, such as ultrasonic flaw detection or so forth, were performed. The roll is in sound condition and no defect was generated. After final machining, the thickness of the shell was 45 mm and the surface hardness was 78~82 in shore hardness.

Figure 10:
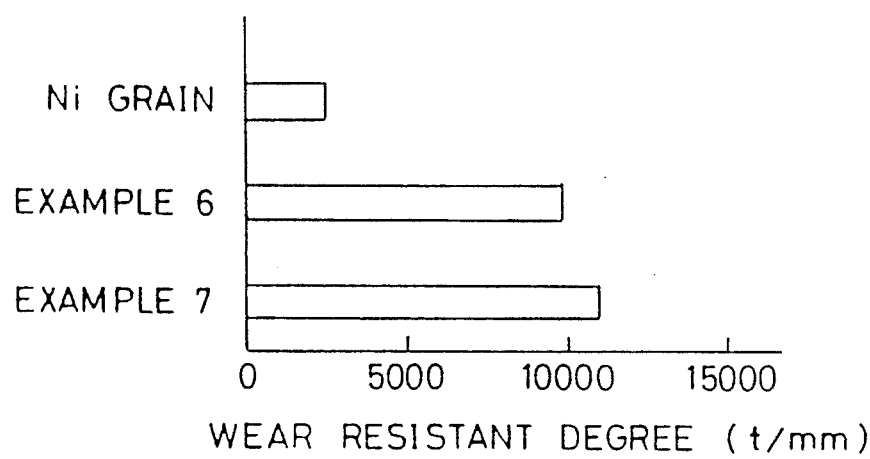
FIG. 10 is a graph comparing the productivity of rolling of the composite roll fabricated according to embodiments 6 and 7 in an actual mill, with that of the conventional roll.

The result of application of the above-mentioned composite roll in an actual hot strip mill finishing stand exhibits superior performance over the conventional Nickel-grain iron roll shown in FIG. 10. Also, good results were obtained without problems, such as roughness of the roll surface.

Embodiment 7

Figure 9:
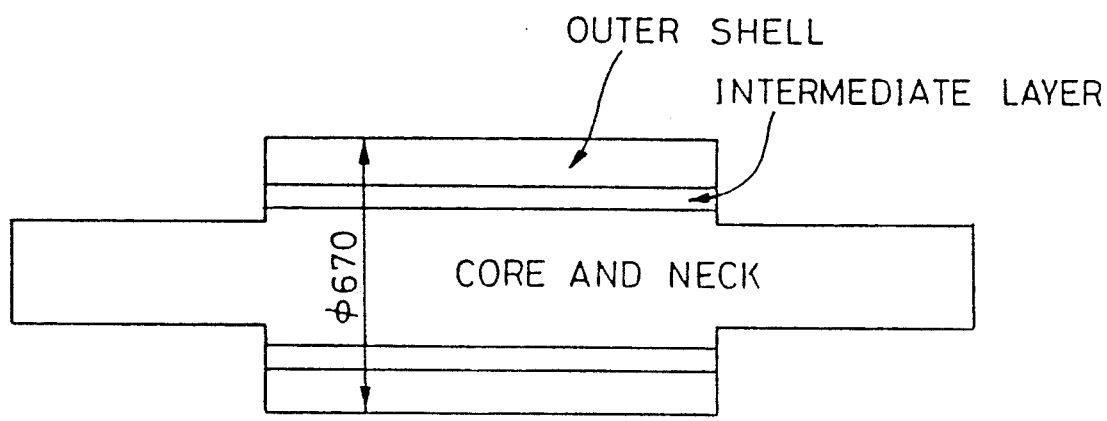
FIG. 9 is a longitudinal section of a composite roll implementing the embodiment 7.

A composite roll having the shell, the intermediate layer and the core having compositions shown in table 12 and having a roll diameter of 670 mm and a barrel length of 1450 mm shown in FIG. 9 was produced through the following processes. With melting the shell material into the molten iron in a low frequency furnace, the molten shell metal was poured to have a thickness of 75 mm at 1490° C. in a centrifugal casting mold rotating at 140 G of centrifugal force. Immediately after solidification of the shell, the molten material for the intermediate layer was poured at a temperature 1540° C. for forming the layer in the thickness of 40 mm. After completely solidifying the intermediate layer, rotation of the mold was terminated and placed in the vertical position. 40 minutes after casting of the shell metal, the molten material of the core and neck was poured at a temperature 1450° C. After cooling to the room temperature, the mold was disassembled. After rough machining, a heat treatment was performed, in which a quenching was performed from a temperature of 1050° C. and subsequently a tempering was performed at a temperature of 550° C. After the heat treatment, inspections, such as ultrasonic flaw detection or so forth, were performed. No defect was generated at the boundary between the shell and the intermediate layer and the boundary between the intermediate layer and the core, and the roll is in sound condition in the internal structure. After final machining, the thickness of the shell was 45 mm and the surface hardness was 78~82 in Shore hardness.

The result of application of the above-mentioned composite roll in an actual hot strip mill finishing stand exhibits superior performance over the conventional Nickel-grain iron roll shown in FIG. 10. Also, good results were obtained without problems, such as roughness of the roll surface.

EFFECT OF THE INVENTION

As set forth above, according to the present invention, a composite roll with high wear resistance and crack resistance having no segregation or so forth can be attained even when the centrifugal casting method which has high productivity and cost advantage, is employed.

TABLE 1

| No. | C | Si | Mn | P | S | Ni | Cr | Mo | V | Nb | |
|---|---|---|---|---|---|---|---|---|---|---|---|
| A | 3.3 | 0.8 | 0.8 | 0.03 | 0.01 | 4.4 | 1.8 | 0.4 | — | — | Comparative Ni grain iron |
| B | 2.5 | 0.5 | 0.5 | 0.03 | 0.01 | — | 6.5 | 3.5 | 5.4 | 1.4 | Invention |
| C | 2.5 | 0.5 | 0.5 | 0.03 | 0.01 | — | 6.5 | 3.5 | 5.4 | 2.7 | Invention |
| D | 2.5 | 0.5 | 0.5 | 0.03 | 0.01 | — | 6.5 | 3.5 | 5.4 | 3.8 | Invention |
| E | 1.9 | 0.8 | 0.6 | 0.04 | 0.01 | — | 5.7 | 2.6 | 3.7 | 1.7 | Invention |
| F | 3.1 | 0.4 | 0.5 | 0.03 | 0.01 | — | 9.5 | 6.1 | 8.3 | 2.0 | Invention |
| R | 2.2 | 0.3 | 0.1 | 0.03 | 0.01 | — | 6.2 | 2.8 | 5.0 | 1.5 | Invention |
| S | 2.3 | 0.2 | 0.2 | 0.02 | 0.01 | — | 6.1 | 3.0 | 5.2 | 1.5 | Invention |
| G | 2.5 | 0.5 | 0.5 | 0.03 | 0.01 | — | 6.5 | 3.5 | 5.4 | — | Comparative |
| H | 2.5 | 0.5 | 0.5 | 0.03 | 0.01 | — | 6.5 | 3.5 | 5.4 | 4.9 | Comparative |
| I | 1.2 | 0.6 | 0.6 | 0.04 | 0.01 | — | 6.2 | 2.7 | 4.9 | — | Comparative |

TABLE 1-continued

| No. | C | Si | Mn | P | S | Ni | Cr | Mo | V | Nb | |
|---|---|---|---|---|---|---|---|---|---|---|---|
| J | 3.0 | 0.9 | 0.5 | 0.04 | 0.01 | — | 6.7 | 4.2 | 9.2 | 4.6 | Comparative |
| K | 4.0 | 0.6 | 0.7 | 0.03 | 0.01 | — | 7.1 | 3.1 | 6.1 | 1.5 | Comparative |
| L | 2.7 | 1.8 | 0.8 | 0.03 | 0.01 | — | 6.4 | 2.8 | 6.1 | 1.7 | Comparative |
| M | 2.7 | 0.8 | 1.5 | 0.03 | 0.01 | — | 6.3 | 2.7 | 6.0 | 1.6 | Comparative |
| N | 2.8 | 0.6 | 0.6 | 0.03 | 0.01 | — | 13.1 | 2.8 | 6.1 | 1.7 | Comparative |
| O | 2.7 | 0.5 | 0.6 | 0.03 | 0.01 | — | 7.1 | 8.6 | 6.1 | 1.8 | Comparative |
| P | 2.7 | 0.5 | 0.6 | 0.03 | 0.01 | — | 6.8 | 4.1 | 2.5 | 1.3 | Comparative |
| Q | 3.3 | 0.5 | 0.6 | 0.03 | 0.01 | — | 6.8 | 4.0 | 11.1 | 3.3 | Comparative |

TABLE 2

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| A | — | — | — | 80 | 1.2 | 1.2 | 3.2 |
| B | 7.92 | 12.75 | 0.26 | 84 | 0.16 | 0.15 | 0.1 |
| C | 10.26 | 12.75 | 0.5 | 85 | 0.14 | 0.14 | 0.2 |
| D | 12.24 | 12.75 | 0.7 | 84 | 0.15 | 0.15 | 0.3 |
| E | 6.76 | 8.25 | 0.46 | 82 | 0.21 | 0.20 | 0.3 |
| F | 11.9 | 17.25 | 0.24 | 86 | 0.13 | 0.12 | 0.4 |
| R | 7.7 | 10.5 | 0.30 | 83 | 0.15 | 0.15 | 0.1 |
| S | 7.9 | 11.25 | 0.29 | 83 | 0.15 | 0.14 | 0.1 |
| G | 5.4 | 12.75 | 0 | 84 | 1.01 | 0.15 | 0.2 |
| H | 14.22 | 12.75 | 0.91 | 68 | 0.53 | 0.52 | 2.0 |
| I | 4.9 | 3.0 | 0 | 57 | 1.42 | 0.33 | 0.2 |
| J | 17.48 | 16.5 | 0.5 | 65 | 0.21 | 0.20 | 0.3 |
| K | 8.8 | 24.0 | 0.26 | 88 | 0.16 | 0.14 | 2.1 |
| L | 9.16 | 14.25 | 0.28 | 78 | 0.25 | 0.22 | 1.8 |
| M | 8.88 | 14.25 | 0.27 | 80 | 0.23 | 0.21 | 1.7 |
| N | 9.16 | 27.0 | 0.28 | 86 | 0.78 | 0.75 | 1.3 |
| O | 9.34 | 14.25 | 0.30 | 88 | 0.28 | 0.25 | 2.3 |
| P | 4.84 | 14.25 | 0.52 | 80 | 0.70 | 0.70 | 1.0 |
| Q | 17.04 | 18.75 | 0.30 | 84 | 0.20 | 0.38 | 1.8 |

TABLE 3

| No. | C | Si | Mn | P | S | Ni | Cr | Mo | V | Nb | |
|---|---|---|---|---|---|---|---|---|---|---|---|
| A | 3.3 | 0.8 | 0.8 | 0.03 | 0.01 | 4.4 | 1.8 | 0.4 | — | — | Comparative Ni grain iron |
| B | 2.7 | 0.6 | 0.5 | 0.04 | 0.01 | 3.2 | 7.4 | 3.7 | 5.8 | 1.5 | Invention |
| C | 2.7 | 0.6 | 0.5 | 0.04 | 0.01 | 3.2 | 7.5 | 3.7 | 5.8 | 2.9 | Invention |
| D | 2.6 | 0.7 | 0.4 | 0.03 | 0.01 | 3.3 | 7.2 | 3.9 | 5.7 | 4.3 | Invention |
| E | 3.3 | 0.4 | 0.8 | 0.04 | 0.02 | 2.7 | 9.6 | 6.8 | 8.7 | 1.9 | Invention |
| F | 1.8 | 1.2 | 0.6 | 0.03 | 0.01 | 5.1 | 5.8 | 2.5 | 3.6 | 2.0 | Invention |
| S | 2.7 | 0.5 | 0.6 | 0.03 | 0.01 | 0.5 | 7.1 | 4.2 | 6.1 | 1.8 | Invention |
| T | 2.6 | 0.5 | 0.5 | 0.03 | 0.01 | 1.5 | 6.8 | 4.1 | 6.0 | 1.5 | Invention |
| U | 2.2 | 0.4 | 0.2 | 0.02 | 0.01 | 0.4 | 6.2 | 2.6 | 5.1 | 1.4 | Invention |
| V | 2.2 | 0.2 | 0.2 | 0.03 | 0.01 | 0.3 | 6.1 | 2.8 | 5.0 | 1.5 | Invention |
| G | 1.2 | 0.6 | 0.4 | 0.03 | 0.01 | 1.5 | 5.4 | 2.7 | 7.9 | — | Comparative |
| H | 2.7 | 0.5 | 0.5 | 0.03 | 0.01 | 3.3 | 7.4 | 3.7 | 5.9 | — | Comparative |
| I | 3.1 | 0.6 | 0.5 | 0.03 | 0.01 | 3.2 | 7.5 | 3.8 | 5.8 | 5.9 | Comparative |
| J | 2.6 | 1.2 | 0.9 | 0.03 | 0.01 | 2.8 | 6.8 | 3.2 | 7.8 | 5.6 | Comparative |
| K | 3.8 | 0.5 | 0.4 | 0.04 | 0.01 | 2.7 | 6.2 | 2.5 | 6.4 | 2.1 | Comparative |
| L | 2.9 | 1.8 | 0.6 | 0.03 | 0.01 | 2.6 | 6.4 | 2.7 | 6.0 | 1.5 | Comparative |
| M | 2.5 | 0.6 | 1.5 | 0.03 | 0.01 | 3.1 | 6.1 | 2.6 | 6.0 | 1.5 | Comparative |
| N | 2.5 | 0.5 | 0.5 | 0.03 | 0.01 | 5.8 | 6.6 | 3.2 | 6.1 | 2.0 | Comparative |
| O | 2.6 | 0.5 | 0.4 | 0.03 | 0.01 | 3.1 | 13.0 | 3.1 | 5.8 | 2.1 | Comparative |
| P | 2.7 | 0.4 | 0.5 | 0.03 | 0.01 | 3.2 | 7.2 | 8.5 | 6.1 | 2.0 | Comparative |
| Q | 2.6 | 0.8 | 0.7 | 0.03 | 0.01 | 3.1 | 6.5 | 4.1 | 2.5 | 1.5 | Comparative |
| R | 3.2 | 0.7 | 1.0 | 0.03 | 0.01 | 3.3 | 6.5 | 2.7 | 11.2 | 3.1 | Comparative |

TABLE 4

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| A | — | — | — | 80 | 1.2 | 1.2 | 3.2 |
| B | 8.5 | 14.25 | 0.26 | 82 | 0.18 | 0.17 | 0.2 |
| C | 11.0 | 14.25 | 0.5 | 84 | 0.19 | 0.19 | 0.3 |
| D | 13.44 | 13.5 | 0.75 | 80 | 0.19 | 0.18 | 0.5 |
| E | 12.12 | 18.75 | 0.22 | 85 | 0.17 | 0.16 | 0.3 |
| F | 7.2 | 7.5 | 0.56 | 81 | 0.22 | 0.21 | 0.4 |
| S | 9.34 | 14.25 | 0.3 | 84 | 0.16 | 0.15 | 0.2 |
| T | 8.7 | 13.5 | 0.25 | 84 | 0.17 | 0.17 | 0.2 |

TABLE 4-continued

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| U | 7.62 | 10.5 | 0.27 | 83 | 0.15 | 0.15 | 0.1 |
| V | 7.7 | 10.5 | 0.3 | 83 | 0.15 | 0.15 | 0.1 |
| G | 7.9 | 3 | 0 | 51 | 1.75 | 0.35 | 0.2 |
| H | 5.9 | 14.25 | 0 | 82 | 1.01 | 0.22 | 0.3 |
| I | 16.42 | 17.25 | 1.02 | 83 | 0.21 | 0.21 | 2.1 |
| J | 17.88 | 13.5 | 0.72 | 62 | 0.23 | 0.24 | 0.5 |
| K | 10.18 | 22.5 | 0.33 | 85 | 0.15 | 0.12 | 2.0 |
| L | 8.7 | 15.75 | 0.25 | 84 | 0.23 | 0.22 | 1.7 |
| M | 8.7 | 12.75 | 0.25 | 82 | 0.24 | 0.22 | 1.8 |
| N | 9.7 | 12.75 | 0.33 | 67 | 0.51 | 0.51 | 0.6 |
| O | 9.58 | 13.5 | 0.36 | 80 | 0.82 | 0.80 | 1.3 |
| P | 9.7 | 14.25 | 0.33 | 86 | 0.31 | 0.27 | 2.4 |
| Q | 5.2 | 13.5 | 0.6 | 78 | 0.73 | 0.73 | 1.1 |
| R | 16.78 | 18.0 | 0.28 | 81 | 0.21 | 0.41 | 1.8 |

TABLE 5

| No | C | Si | Mn | P | S | Ni | Cr | Mo | V | Nb | Co | |
|---|---|---|---|---|---|---|---|---|---|---|---|---|
| A | 3.3 | 0.8 | 0.8 | 0.03 | 0.01 | 4.4 | 1.8 | 0.4 | — | — | — | Comparative Ni grain iron |
| B | 1.8 | 0.5 | 0.4 | 0.02 | 0.01 | 1.2 | 8.2 | 2.8 | 4.1 | 0.9 | 3.1 | Invention |
| C | 2.3 | 0.4 | 0.5 | 0.02 | 0.01 | 0.5 | 5.5 | 3.1 | 5.5 | 1.6 | 5.2 | Invention |
| D | 3.2 | 0.3 | 0.3 | 0.02 | 0.01 | 0.9 | 5.5 | 2.9 | 8.8 | 2.0 | 1.5 | Invention |
| E | 2.3 | 0.4 | 0.5 | 0.04 | 0.01 | 0.5 | 5.5 | 3.2 | 5.4 | 3.1 | 5.2 | Invention |
| F | 2.2 | 0.4 | 0.5 | 0.03 | 0.01 | 4.8 | 6.1 | 2.5 | 5.0 | 1.5 | 8.0 | Invention |
| G | 1.2 | 0.7 | 0.6 | 0.02 | 0.01 | 3.1 | 6.0 | 4.2 | 6.0 | — | 4.2 | Comparative |
| H | 2.3 | 0.5 | 0.5 | 0.02 | 0.01 | 0.5 | 5.5 | 3.1 | 5.4 | — | 5.1 | Comparative |
| I | 3.2 | 0.6 | 0.4 | 0.03 | 0.01 | 3.0 | 6.5 | 3.2 | 6.1 | 6.0 | 4.5 | Comparative |
| J | 2.5 | 0.4 | 0.3 | 0.03 | 0.01 | 2.8 | 6.8 | 3.4 | 7.9 | 5.4 | 4.1 | Comparative |
| K | 3.9 | 0.5 | 0.5 | 0.04 | 0.01 | 2.7 | 6.2 | 2.5 | 6.5 | 2.1 | 4.3 | Comparative |
| L | 2.7 | 1.8 | 0.8 | 0.03 | 0.01 | 2.7 | 6.1 | 2.8 | 6.1 | 1.6 | 4.2 | Comparative |
| M | 2.5 | 0.6 | 1.5 | 0.03 | 0.01 | 2.6 | 6.1 | 2.6 | 6.0 | 1.5 | 4.2 | Comparative |
| N | 2.6 | 0.4 | 0.4 | 0.03 | 0.01 | 6.0 | 6.0 | 3.2 | 6.0 | 1.8 | 4.1 | Comparative |
| O | 2.5 | 0.5 | 0.4 | 0.03 | 0.01 | 3.1 | 13.0 | 3.1 | 5.9 | 2.1 | 4.5 | Comparative |
| P | 2.7 | 0.4 | 0.5 | 0.03 | 0.01 | 3.0 | 6.7 | 8.6 | 6.1 | 1.5 | 4.3 | Comparative |
| Q | 2.6 | 0.6 | 0.5 | 0.03 | 0.01 | 1.9 | 6.5 | 4.1 | 2.5 | 1.6 | 5.0 | Comparative |
| R | 3.3 | 0.7 | 0.5 | 0.03 | 0.01 | 2.5 | 6.2 | 3.1 | 11.1 | 4.2 | 4.8 | Comparative |

TABLE 6

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| A | — | — | — | 80 | 1.2 | 1.2 | 3.2 |
| B | 5.72 | 7.5 | 0.22 | 80 | 0.24 | 0.25 | 0.3 |
| C | 8.38 | 11.25 | 0.29 | 82 | 0.21 | 0.21 | 0.2 |
| D | 12.4 | 18.0 | 0.23 | 83 | 0.15 | 0.16 | 0.3 |
| E | 10.98 | 11.25 | 0.57 | 83 | 0.17 | 0.16 | 0.4 |
| F | 7.7 | 10.5 | 0.3 | 81 | 0.16 | 0.16 | 0.1 |
| G | 6.0 | 3.0 | 0 | 53 | 1.12 | 0.51 | 0.2 |
| H | 5.4 | 11.25 | 0 | 82 | 0.91 | 0.18 | 0.2 |
| I | 16.9 | 18.0 | 0.98 | 83 | 0.22 | 0.20 | 2.0 |
| J | 17.62 | 12.75 | 0.68 | 64 | 0.26 | 0.25 | 0.4 |
| K | 10.28 | 23.25 | 0.32 | 87 | 0.15 | 0.14 | 2.1 |
| L | 8.98 | 14.25 | 0.26 | 84 | 0.25 | 0.24 | 1.8 |
| M | 8.7 | 12.75 | 0.25 | 82 | 0.26 | 0.25 | 1.7 |
| N | 9.24 | 13.5 | 0.3 | 68 | 0.50 | 0.51 | 0.5 |
| O | 9.68 | 12.75 | 0.36 | 81 | 0.81 | 0.80 | 1.2 |
| P | 8.8 | 14.25 | 0.25 | 85 | 0.27 | 0.26 | 2.2 |
| Q | 5.38 | 13.5 | 0.64 | 78 | 0.72 | 0.72 | 1.2 |
| R | 18.66 | 18.75 | 0.38 | 83 | 0.20 | 0.21 | 2.0 |

TABLE 7

| No | C | Si | Mn | P | S | Ni | Cr | Mo | V | Nb | Co | |
|---|---|---|---|---|---|---|---|---|---|---|---|---|
| A | 3.3 | 0.8 | 0.8 | 0.03 | 0.01 | 4.4 | 1.8 | 0.4 | — | — | — | Comparative Ni grain iron |
| B | 1.9 | 0.4 | 0.3 | 0.02 | 0.01 | — | 8.1 | 2.9 | 4.2 | 0.9 | 4.1 | Invention |
| C | 2.3 | 0.3 | 0.4 | 0.02 | 0.01 | — | 6.0 | 3.2 | 5.0 | 1.5 | 4.1 | Invention |
| D | 3.1 | 0.3 | 0.4 | 0.02 | 0.01 | — | 6.1 | 2.8 | 8.2 | 2.1 | 1.4 | Invention |
| E | 2.6 | 0.4 | 0.3 | 0.02 | 0.01 | — | 6.0 | 3.3 | 5.2 | 3.7 | 8.1 | Invention |
| F | 1.1 | 0.8 | 0.6 | 0.02 | 0.01 | — | 6.2 | 4.1 | 6.5 | — | 4.2 | Comparative |

TABLE 7-continued

| No | C | Si | Mn | P | S | Ni | Cr | Mo | V | Nb | Co | |
|---|---|---|---|---|---|---|---|---|---|---|---|---|
| G | 2.4 | 0.7 | 0.5 | 0.02 | 0.01 | — | 5.5 | 3.2 | 6.2 | — | 5.1 | Comparative |
| H | 3.2 | 0.7 | 0.6 | 0.02 | 0.01 | — | 6.5 | 3.1 | 5.1 | 6.2 | 3.8 | Comparative |
| I | 2.5 | 0.4 | 0.4 | 0.02 | 0.01 | — | 6.8 | 3.4 | 8.2 | 5.1 | 6.2 | Comparative |
| J | 3.9 | 0.4 | 0.4 | 0.02 | 0.01 | — | 6.1 | 2.6 | 5.2 | 1.7 | 4.1 | Comparative |
| K | 2.8 | 1.9 | 0.6 | 0.03 | 0.01 | — | 6.2 | 2.8 | 6.7 | 2.2 | 4.2 | Comparative |
| L | 2.7 | 0.6 | 1.6 | 0.02 | 0.01 | — | 6.1 | 2.7 | 6.2 | 1.8 | 4.1 | Comparative |
| M | 2.5 | 0.5 | 0.4 | 0.02 | 0.01 | — | 13.2 | 3.1 | 5.8 | 2.1 | 4.2 | Comparative |
| N | 2.7 | 0.6 | 0.5 | 0.03 | 0.01 | — | 6.7 | 8.7 | 6.1 | 1.5 | 4.0 | Comparative |
| O | 2.6 | 0.6 | 0.5 | 0.03 | 0.01 | — | 6.5 | 4.1 | 2.2 | 1.4 | 4.3 | Comparative |
| P | 2.9 | 0.5 | 0.4 | 0.03 | 0.01 | — | 6.2 | 3.1 | 11.2 | 5.1 | 4.1 | Comparative |
| Q | 2.2 | 0.4 | 0.3 | 0.03 | 0.01 | — | 6.2 | 2.6 | 5.1 | 1.6 | 0.6 | Invention |

TABLE 8

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| A | — | — | — | 80 | 1.2 | 1.2 | 3.2 |
| B | 5.82 | 8.25 | 0.21 | 83 | 0.22 | 0.21 | 0.2 |
| C | 7.7 | 11.25 | 0.3 | 81 | 0.22 | 0.22 | 0.3 |
| D | 11.98 | 17.25 | 0.26 | 84 | 0.24 | 0.21 | 0.5 |
| E | 11.86 | 13.5 | 0.71 | 82 | 0.19 | 0.18 | 0.5 |
| F | 6.5 | 2.25 | 0 | 52 | 1.14 | 0.81 | 0.4 |
| G | 6.2 | 12.0 | 0 | 82 | 0.88 | 0.19 | 0.3 |
| H | 16.26 | 18.0 | 1.22 | 81 | 0.20 | 0.21 | 2.2 |
| I | 17.38 | 12.75 | 0.62 | 57 | 0.26 | 0.24 | 0.5 |
| J | 8.26 | 23.25 | 0.33 | 85 | 0.24 | 0.18 | 2.5 |
| K | 10.66 | 15.0 | 0.33 | 82 | 0.26 | 0.27 | 2.1 |
| L | 9.44 | 14.25 | 0.29 | 79 | 0.31 | 0.30 | 1.9 |
| M | 9.58 | 12.75 | 0.36 | 81 | 0.85 | 0.84 | 1.6 |
| N | 8.8 | 14.25 | 0.25 | 85 | 0.27 | 0.26 | 2.2 |
| O | 4.72 | 13.5 | 0.64 | 78 | 0.71 | 0.72 | 1.3 |
| P | 20.4 | 15.75 | 0.46 | 83 | 0.22 | 0.21 | 2.1 |
| Q | 7.98 | 10.5 | 0.31 | 81 | 0.21 | 0.20 | 0.3 |

TABLE 9

| No. | C | Si | Mn | P | S | Ni | Cr | Mo | V | Nb | Cu | W | Ti | Zr | B | |
|---|---|---|---|---|---|---|---|---|---|---|---|---|---|---|---|---|
| A5 | 3.3 | 0.8 | 0.8 | 0.03 | 0.01 | 4.4 | 1.8 | 0.4 | — | — | — | — | — | — | — | Comparative Ni grain iron |
| B5 | 2.2 | 0.4 | 0.4 | 0.02 | 0.01 | 0.6 | 6.5 | 2.8 | 5.2 | 1.5 | 0.6 | — | — | — | — | Invention |
| C5 | 2.1 | 0.4 | 0.5 | 0.02 | 0.01 | — | 6.2 | 2.7 | 5.4 | 1.7 | — | 0.5 | — | — | — | Invention |
| D5 | 2.2 | 0.3 | 0.4 | 0.02 | 0.01 | — | 6.4 | 2.9 | 5.1 | 1.6 | — | — | 0.2 | — | — | Invention |
| E5 | 2.1 | 0.3 | 0.3 | 0.02 | 0.01 | — | 6.7 | 2.6 | 5.2 | 1.5 | — | — | — | 0.2 | — | Invention |
| F5 | 2.3 | 0.4 | 0.3 | 0.02 | 0.01 | — | 6.5 | 2.8 | 5.2 | 1.5 | — | — | — | — | 0.05 | Invention |
| G5 | 2.3 | 0.5 | 0.6 | 0.02 | 0.01 | 0.5 | 6.3 | 3.1 | 7.1 | 1.8 | 0.4 | 0.4 | — | — | — | Invention |
| H5 | 2.4 | 0.5 | 0.5 | 0.02 | 0.01 | — | 6.2 | 2.7 | 5.5 | 1.6 | — | — | 0.2 | — | 0.02 | Invention |
| I5 | 2.2 | 0.4 | 0.4 | 0.02 | 0.01 | 0.5 | 6.5 | 2.6 | 5.0 | 1.5 | — | 0.3 | — | — | — | Invention |
| J5 | 2.8 | 0.4 | 0.3 | 0.02 | 0.01 | 0.6 | 6.1 | 2.7 | 6.0 | 1.4 | — | — | — | 0.1 | 0.01 | Invention |
| K5 | 2.4 | 0.6 | 0.7 | 0.02 | 0.01 | — | 6.2 | 3.1 | 5.4 | 1.7 | 2.8 | — | — | — | — | Comparative |
| L5 | 2.7 | 0.4 | 0.6 | 0.02 | 0.01 | 0.3 | 7.1 | 3.2 | 5.6 | 1.3 | — | 2.5 | — | — | — | Comparative |
| M5 | 2.6 | 0.4 | 0.4 | 0.02 | 0.01 | 0.8 | 6.8 | 2.8 | 6.1 | 1.4 | — | — | 2.6 | — | 0.3 | Comparative |
| N5 | 2.4 | 0.3 | 0.6 | 0.02 | 0.01 | — | 6.5 | 3.1 | 5.3 | 1.5 | — | — | — | 2.5 | — | Comparative |

TABLE 10

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| A5 | — | — | — | 80 | 1.2 | 1.2 | 3.2 |
| B5 | 7.9 | 10.5 | 0.29 | 81 | 0.26 | 0.25 | 0.5 |
| C5 | 8.46 | 9.75 | 0.31 | 81 | 0.20 | 0.20 | 0.3 |
| D5 | 7.98 | 10.5 | 0.31 | 79 | 0.23 | 0.21 | 0.4 |
| E5 | 7.9 | 9.75 | 0.29 | 79 | 0.24 | 0.22 | 0.4 |
| F5 | 7.9 | 11.25 | 0.29 | 83 | 0.21 | 0.21 | 0.3 |
| G5 | 10.34 | 11.25 | 0.25 | 84 | 0.24 | 0.22 | 0.5 |
| H5 | 8.38 | 12.0 | 0.29 | 80 | 0.25 | 0.23 | 0.3 |
| I5 | 7.7 | 10.5 | 0.3 | 82 | 0.22 | 0.21 | 0.4 |
| J5 | 8.52 | 15.0 | 0.23 | 80 | 0.25 | 0.24 | 0.4 |
| K5 | 8.46 | 12.0 | 0.31 | 78 | 0.72 | 0.71 | 1.7 |
| L5 | 7.94 | 14.25 | 0.23 | 85 | 0.75 | 0.20 | 0.7 |
| M5 | 8.62 | 13.5 | 0.23 | 78 | 0.81 | 0.88 | 1.9 |

TABLE 10-continued

| No. | V + 1.8 Nb | 7.5C−6.0 | Nb/V | Hardness Hs | Wear loss (g) Outer Skin | Wear loss (g) Inner Layer | Maximum Depth of Thermal shock Crack (mm) |
|---|---|---|---|---|---|---|---|
| N5 | 8.0 | 12.0 | 0.28 | 78 | 0.72 | 0.75 | 0.8 |

TABLE 11

| | C | Si | Mn | P | S | Ni | Cr | Mo | V | Nb |
|---|---|---|---|---|---|---|---|---|---|---|
| Shell | 2.2 | 0.4 | 0.4 | 0.02 | 0.01 | 0.6 | 6.3 | 2.7 | 5.1 | 1.6 |
| Core and Neck | 3.1 | 1.1 | 0.5 | 0.04 | 0.01 | 0.8 | — | — | — | — |

TABLE 12

| | C | Si | Mn | P | S | Ni | Cr | Mo | V | Nb | Mg |
|---|---|---|---|---|---|---|---|---|---|---|---|
| Shell | 2.2 | 0.3 | 0.3 | 0.02 | 0.01 | — | 6.1 | 2.5 | 4.9 | 1.5 | — |
| Intermediate Layer | 1.4 | 2.0 | 0.4 | 0.03 | 0.01 | — | — | — | — | — | — |
| Core and Neck | 3.5 | 2.5 | 0.4 | 0.03 | 0.01 | 1.3 | — | — | — | — | 0.07 |

I claim:

1. A shell material for a roll composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and satisfies the following formulae (1) and (2):

$$V + 1.8\, Nb \leq 7.5\, C - 6.0\ (\%) \tag{1}$$

$$0.2 \leq Nb/V \leq 0.8 \tag{2}$$

and remainder of Fe and inherent impurities.

2. A shell material for a roll composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and further composed of one or both of Ni: 5.5% or less and Co: 10.0% or less, and satisfies the following formulae (1) and (2):

$$V + 1.8\, Nb \leq 7.5\, C - 6.0\ (\%) \tag{1}$$

$$0.2 \leq Nb/V \leq 0.8 \tag{2}$$

and remainder of Fe and inherent impurities.

3. A shell material for a roll composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and further composed of one or two or more of Cu: 2.0% or less, W: 1.0% or less, Ti: 2.0% or less, Zr: 2.0% or less and B: 0.1% or less, and satisfies the following formulae (1) and (2):

$$V + 1.8\, Nb \leq 7.5\, C - 6.0\ (\%) \tag{1}$$

$$0.2 \leq Nb/V \leq 0.8 \tag{2}$$

and remainder of Fe and inherent impurities.

4. A shell material for a roll composed of C: 1.5~3.5%, Si: 1.5% or less, Mn: 1.2% or less, Cr: 5.5~12.0%, Mo: 2.0~8.0%, V: 3.0~10.0%, Nb: 0.6~7.0%, and further composed of one or both of Ni: 5.5% or less and Co: 10.0% or less, one or two or more of Cu: 2.0% or less, W: 1.0% or less, Ti: 2.0% or less, Zr: 2.0% or less and B: 0.1% or less, and satisfies the following formulae (1) and (2):

$$V + 1.8\, Nb \leq 7.5\, C - 6.0\ (\%) \tag{1}$$

$$0.2 \leq Nb/V \leq 0.8 \tag{2}$$

and remainder of Fe and inherent impurities.

5. A centrifugal cast roll formed with the shell as defined in claim 1 and a core and neck material of gray iron or ductile iron integrated with the shell by metallurgical bonding.

6. A centrifugal cast roll as set forth in claim 5, which includes an intermediate layer between the shell and the core material, in which the shell and the core material are integrated by metallurgical bonding via the intermediate layer.

7. A centrifugal cast roll formed with the shell as defined in claim 2 and a core and neck material of gray iron or ductile iron integrated with the shell by metallurgical bonding.

8. A centrifugal cast roll formed with the shell as defined in claim 3 and a core and neck material of gray iron or ductile iron integrated with the shell by metallurgical bonding.

9. A centrifugal cast roll formed with the shell as defined in claim 4 and a core and neck material of gray iron or ductile iron integrated with the shell by metallurgical bonding.

10. A centrifugal cast roll as set forth in claim 7, which includes an intermediate layer between the shell and the core material in which the shell and the core material are integrated by metallurgical bonding via the intermediate layer.

11. A centrifugal cast roll as set forth in claim 8, which includes an intermediate layer between the shell and the core material in which the shell and the core material are integrated by metallurgical bonding via the intermediate layer.

12. A centrifugal cast roll as set forth in claim 9, which includes an intermediate layer between the shell and the core material in which the shell and the core material are integrated by metallurgical bonding via the intermediate layer.

* * * * *